US010566854B2

(12) United States Patent
Koizumi et al.

(10) Patent No.: US 10,566,854 B2
(45) Date of Patent: Feb. 18, 2020

(54) ROTATING ELECTRIC MACHINE

(71) Applicant: Hitachi Automotive Systems, Ltd., Hitachinaka-shi, Ibaraki (JP)

(72) Inventors: Takayuki Koizumi, Hitachinaka (JP); Hiroshi Hamano, Hitachinaka (JP); Yasuyuki Saito, Hitachinaka (JP); Yousuke Umesaki, Hitachinaka (JP); Yuji Kanoh, Hitachinaka (JP); Genzou Iwaki, Tokyo (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 118 days.

(21) Appl. No.: 15/755,383

(22) PCT Filed: Jul. 29, 2016

(86) PCT No.: PCT/JP2016/072249
§ 371 (c)(1),
(2) Date: Feb. 26, 2018

(87) PCT Pub. No.: WO2017/047247
PCT Pub. Date: Mar. 23, 2017

(65) Prior Publication Data
US 2018/0254673 A1 Sep. 6, 2018

(30) Foreign Application Priority Data
Sep. 17, 2015 (JP) .................................. 2015-183537

(51) Int. Cl.
*H02K 1/00* (2006.01)
*H02K 1/16* (2006.01)
(Continued)

(52) U.S. Cl.
CPC .............. *H02K 1/16* (2013.01); *H02K 1/165* (2013.01); *H02K 3/04* (2013.01); *H02K 3/12* (2013.01);
(Continued)

(58) Field of Classification Search
CPC .......... H02K 3/345; H02K 3/34; H02K 1/165; H02K 3/48; H02K 3/12; H02K 1/16
(Continued)

(56) References Cited

U.S. PATENT DOCUMENTS 2,094,358 A * 9/1937 Kilgore .................... H02K 3/24
310/262
4,994,700 A * 2/1991 Bansal ..................... H02K 3/24
310/215

(Continued)

FOREIGN PATENT DOCUMENTS

JP 4-17539 A 1/1992
JP 11-187599 A 7/1999
(Continued)

OTHER PUBLICATIONS

International Search Report (PCT/ISA/210) issued in PCT Application No. PCT/JP2016/072249 dated Sep. 27, 2016 with English-language translation (five (5) pages).
(Continued)

*Primary Examiner* — Thanh Lam
(74) *Attorney, Agent, or Firm* — Crowell & Moring LLP

(57) ABSTRACT

The efficiency of inserting a coil conductor into a slot of a stator core is improved in the present invention. Included are a rotor and a stator. The stator includes a stator core formed with a plurality of slots formed at a predetermined depth in a radial direction and arranged while spaced apart from each other in a circumferential direction and stator winding having a coil conductor inserted in each of the slots. A plurality of protrusions are formed in each of the slots of the stator core toward a space into which the coil conductor is inserted.

6 Claims, 4 Drawing Sheets

(51) Int. Cl.
*H02K 3/34* (2006.01)
*H02K 3/04* (2006.01)
*H02K 3/12* (2006.01)
*H02K 3/48* (2006.01)

(52) U.S. Cl.
CPC ............... *H02K 3/34* (2013.01); *H02K 3/345* (2013.01); *H02K 3/48* (2013.01); *H02K 2203/15* (2013.01); *H02K 2213/03* (2013.01)

(58) Field of Classification Search
USPC .................................. 310/216.001, 214–215
See application file for complete search history.

(56) References Cited

U.S. PATENT DOCUMENTS

| | | | |
|---|---|---|---|
| 6,137,201 A | | 10/2000 | Umeda et al. |
| 2002/0067095 A1* | | 6/2002 | Hatley ............... H02K 15/0018 |
| | | | 310/214 |
| 2014/0319959 A1* | | 10/2014 | Kaiser ................... H02K 3/345 |
| | | | 310/215 |
| 2015/0263578 A1* | | 9/2015 | Hayslett ................. H02K 3/345 |
| | | | 310/215 |
| 2016/0181882 A1* | | 6/2016 | Iwaki ..................... H02K 3/345 |
| | | | 310/215 |

FOREIGN PATENT DOCUMENTS

| | | |
|---|---|---|
| JP | 2001-510016 A | 7/2001 |
| JP | 2010-136477 A | 6/2010 |
| JP | 2012-147674 A | 8/2012 |
| JP | 2013-143819 A | 7/2013 |
| WO | WO 98/34321 A1 | 8/1998 |

OTHER PUBLICATIONS

Japanese-language Written Opinion (PCT/ISA/237) issued in PCT Application No. PCT/JP2016/072249 dated Sep. 27, 2016 (Four (4) pages).

Japanese-language Office Action issued in counterpart Japanese Application No. 2017-539751 dated Dec. 25, 2018 with English translation (five (5) pages).

* cited by examiner

ROTATING ELECTRIC MACHINE

TECHNICAL FIELD

The present invention relates to a rotating electric machine.

BACKGROUND ART

Rotating electric machines used for driving a vehicle are particularly desired to be downsized and to have higher output as compared with ordinary rotating electric machines. In a stator of a rotating electric machine, by using, as a coil, a segment coil conductor having a large cross-sectional area, it is possible to raise the space factor of the conductor in a slot of a stator core, thereby achieving downsizing and higher output. In a slot of a stator core, a plurality of segment coil conductors are inserted on an inner circumferential side and an outer circumferential side. Furthermore, a slot insulating paper is inserted between the segment coil conductors adjacent to each other in a direction from the inner circumference to the outer circumference and between the respective segment coil conductors and the stator core. The slot insulating paper is required to have a sufficient shape and area to ensure insulating property. In addition, it is preferable to have a thickness as thin as possible in order to raise the space factor of the conductor.

As a slot insulating paper inserted in a slot of a stator core, there is known a slot insulating paper which is formed into a substantially B-letter shape covering an outer circumference of each segment coil conductor and having an overlapping portion between adjacent segment coil conductors (for example, see PTL 1). In this structure, the slot insulating paper having a substantially B-letter shape is inserted into each slot of the stator core in advance. A segment coil conductor is inserted therein (for example, see PTL 1).

CITATION LIST

Patent Literature

PTL 1: JP 2012-147674 A

SUMMARY OF INVENTION

Technical Problem

A rotating electric machine described in PTL 1 has a structure in which a position of a segment coil conductor is held by the slot insulating paper. In the structure in which the segment coil conductor is held only by the slot insulating paper as described above, it is required that the slot insulating paper is a highly rigid member, in other words, a thick member difficult to be handled. For this reason, assembling work takes time, and the efficiency in assembling is low.

Solution to Problem

A rotating electric machine of the present invention includes: a rotor pivotally supported by a rotating shaft; and a stator arranged on a circumferential surface of the rotor with a minute gap interposed therebetween. The stator includes: a stator core formed with a plurality of slots formed at a predetermined depth in a radial direction and arranged while spaced apart from each other in a circumferential direction; and stator winding having coil conductors inserted in each of the slots. A plurality of protrusions are formed in each of the slots of the stator core toward a space into which the coil conductors are inserted.

Advantageous Effects of Invention

According to the present invention, it is possible to hold the coil conductors by the plurality of protrusions provided in each of the slots, thereby improving the efficiency of assembling work.

DESCRIPTION OF EMBODIMENTS

First Embodiment

Figure 1:
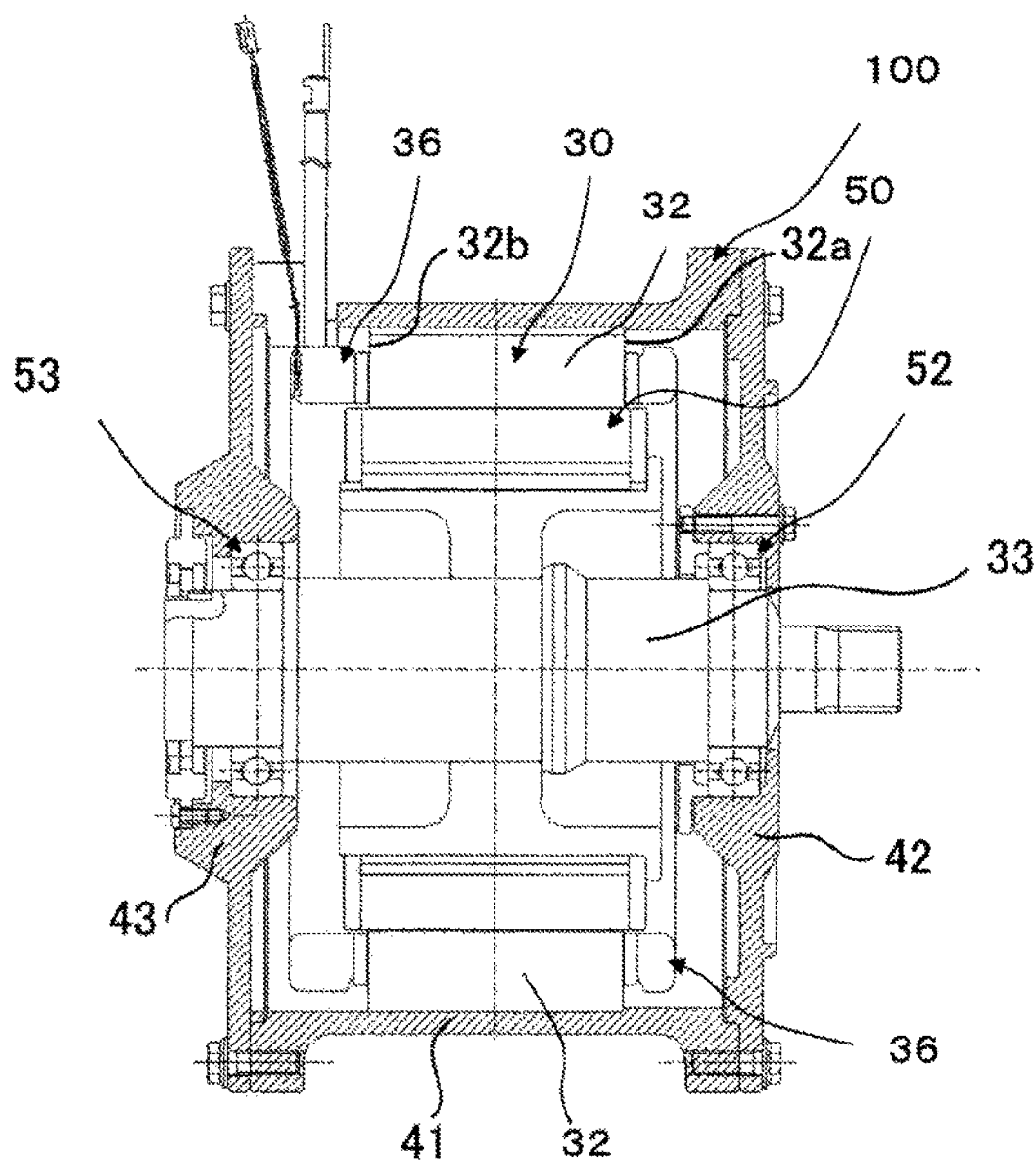
FIG. 1 is a cross-sectional view illustrating an internal structure of a rotating electric machine according to an embodiment of the present invention.

Hereinafter, a rotating electric machine of the present invention will be described with reference to the drawings. FIG. 1 is a cross-sectional view illustrating an internal structure of a rotating electric machine according to an embodiment of the present invention. A rotating electric machine 100 is used as an electric motor or an electric motor/generator for a vehicle such as a hybrid car or an electric car. The rotating electric machine 100 has a cylindrical housing 41 having both ends in the axial direction opened, a cover member 42 closing one of the openings of the housing 41, and a bottom member 43 closing the other opening of the housing 41. On the inner surface of the housing 41, a stator 30 is fixed by shrinkage fitting or other means. Although not illustrated, a flow path of cooling water is formed between the housing 41 and the stator 30. The stator 30 includes a stator core 32 in which a plurality of slots 1 (see FIG. 2) are arranged in the circumferential direction and a stator winding 36 having coil conductors 5 (see FIG. 2). Each of the slots 1 is formed in such a manner as to penetrate from one end surface 32a of the stator core 32 in the axial direction to the other end surface 32b. The stator core 32 is made of a laminated steel plate formed by laminating electromagnetic steel plates. Three-phase alternating currents of a U phase, a V phase, and a W phase, for example, flow through the stator winding 36, and the rotating electric machine 100 operates as an electric motor or a generator.

On the inner circumference of the stator core 32, a rotor 50 is arranged with a minute gap formed between the stator core 32 and the rotor 50. The rotor 50 may be either a permanent magnet type or an induction type. The rotor 50 is pivotally supported by a shaft 33 arranged at the center of the housing 41 and rotates integrally with the shaft 33.

One end side of the shaft 33 is rotatably supported by a bearing 52. The bearing 52 is supported by the cover member 42 which is a bearing holder. The other end side of the shaft 33 is rotatably supported by a bearing 53. The bearing 53 is supported by the bottom member 43 which is a bearing holder.

Figure 2:
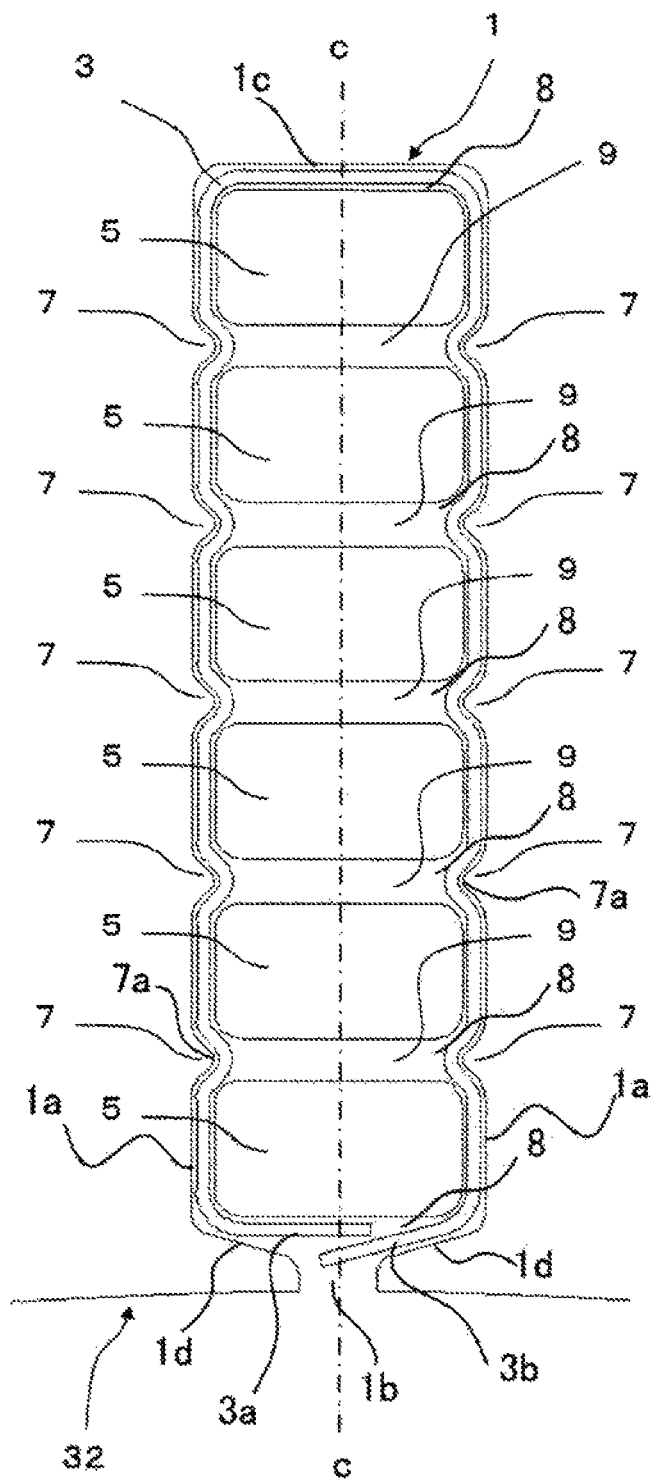
FIG. 2 is an enlarged sectional view of the interior of one slot obtained by cutting a stator core of the rotating electric machine illustrated in FIG. 1 by a surface perpendicular to the axial direction at a center position in the axial direction.

FIG. 2 is an enlarged sectional view of the interior of one slot obtained by cutting a stator core of the rotating electric machine illustrated in FIG. 1 by a surface perpendicular to the axial direction at a center position in the axial direction. On the inner circumferential side of the stator core 32, a plurality of slots 1 are arranged in the circumferential direction while spaced from each other. Each of the slots 1 is formed at a predetermined depth from the inner circumference surface of the stator core 32 toward the outer circumference side. Each of the slots 1 extends in a direction perpendicular to the inner circumferential surface of the stator core 32 and has a rectangular cross section having a pair of side surfaces 1a arranged while spaced from each other in the circumferential direction of the stator core 32. On the inner circumference side of a slot 1, an opening 1b opened to the outside is formed. On the opposite side of the opening 1b of the slot 1, a bottom surface 1c is formed. In a cross-sectional shape of the slot 1, a length from the inner circumferential side of the stator core 32 extending toward the outer circumference side thereof, in other words, a length from the opening 1b to the bottom surface 1c is longer than a circumferential length of the stator core 32, in other words, a length between the pair of side surfaces 1a. Note that a surface continuing from the opening 1b to the pair of side surfaces 1a is inclined, and this inclined surface is regarded as a partitioning surface 1d.

Inside each of the slots 1, a plurality (six in FIG. 2) of coil conductors 5 are inserted. Each of the coil conductors 5 is a member, called a rectangular wire, having a substantially rectangular sectional shape. In the rectangular shape of a coil conductor 5, a circumferential length of the stator core 32 is longer than a length in the radial direction. Although not illustrated, each of the coil conductors 5 is inserted into the slot 1 from the outside of the end surface 32a of the stator core 32, penetrates through the slot 1 in the axial direction, and is led to the outside of the other end surface 32b of the stator core 32. Inside the same slot 1, coil conductors 5 of different phases are inserted. On each of the side surfaces 1a of the slot 1, a plurality (five in FIG. 2) of protrusions 7 are formed protruding toward the inside of the slot 1. A cross section of a protrusion 7 has a substantially isosceles triangle shape or an equilateral triangle shape. This cross-sectional shape is not limited to the shape illustrated. The protrusions 7 are symmetrically arranged with respect to the center plane c-c between the pair of side surfaces 1a of the slot 1. That is, in the slot 1, five pairs of protrusions 7 are formed spaced apart from each other in the circumferential direction of the stator core 32, each of the pairs facing each other, and inside the slot 1 the space from the opening 1b to the bottom surface 1c is divided into six substantially equal parts by these five pairs of protrusions 7. As a result, six partition regions 8 are formed in the slot 1.

Each of the coil conductors 5 are inserted in one of the six partition regions 3 formed in the slot 1. A distance between apex portions 7a of the pair of protrusions 7 facing in the circumferential direction is set to be smaller than a length in the circumferential direction of the stator core 32 of the coil conductor 5.

A slot insulating paper 3 is interposed between the respective coil conductors 5 and the inner surface of the slot 1, that is, the pair of side surfaces 1a, the bottom surface 1c, the opening 1b, and the partitioning surface 1d from the respective side surfaces 1a. The slot insulating paper 3 covers the side surfaces 1a including the protrusions 7, the bottom surface 1c, and the partitioning surface 1d. Therefore, the respective coil conductors 5 are insulated from the stator core 32 by the slot insulating paper 3. Moreover, gaps 9 are formed between the respective coil conductors 5 inserted in each of the slots 1. As a result, a space insulation distance is ensured between the coil conductors 5 in the slot 1. That is, a pair of protrusions 7 protrudes toward a gap 9 between coil conductors 5 such that a predetermined distance is kept between the coil conductors 5 in the radial direction of the stator core 32, thereby positioning the adjacent coil conductors 5 in the slot 1.

The slot insulating paper 3 is a plate material formed of an insulating sheet member, that is, a slot insulating sheet. The thickness is, for example, 0.1 mm to 0.5 mm. As illustrated in FIG. 2, the slot insulating paper 3 does not have a partition portion or an overlapping portion for insulating between adjacent coil conductors 5 in the slot 1. Therefore, a structure of the slot insulating paper 3 is simplified. Each of the coil conductors 5 is positioned by protrusions 7 covered with the slot insulating paper 3, and an insulating space 9 is secured between adjacent coil conductors 5. As a result, the slot insulating paper 3 is not required to have rigidity for securing the space insulation distance between the coil conductors 5 inserted adjacent to each other in a direction from the inner circumference to the outer circumference, and thus it is possible to set the thickness considering only the insulating property. Therefore, the thickness of the slot-insulating paper 3 can be reduced. In this manner, the slot insulating paper 3 does not have a partition portion or an overlapping portion, and thus the thickness thereof can be thin, thus allowing the cost to be reduced. In addition, by reducing the thickness of the slot insulating paper 3, the space factor of the coil conductors 5 is raised.

As illustrated in FIG. 2, a procedure of inserting the slot insulating paper 3 and the plurality of coil conductors 5 in the slot 1 will be described below.

Before being inserted into the slot 1, the slot insulating paper 3 is formed into a cylindrical shape having an annular cross section as illustrated in FIG. 2. That is, a cross section of the slot insulating paper 3 is formed into substantially a D-letter shape along the inner surface of the slot 1. The slot insulating paper 3 further has one end portion 3a and the other end portion 3b between a coil conductor 5 on the innermost circumferential side and the opening 1b of the slot 1. In the slot insulating paper 3, distal ends of the end portion 3a and the other end portion 3b overlaps, and the shape of a cross section thereof is substantially annular. The slot insulating paper 3 is a cylindrical member in which the annular cross section extends from the end surface 32a to the other end surface 32b of the stator core 32. The slot insulating paper 3 formed into the cylindrical shape is inserted into the slot 1 as illustrated in FIG. 2. Then, each of the coil conductors 5 is inserted into one of the partition regions 8 formed in the slot 1. By such a simple procedure, as illustrated in FIG. 2, the work of inserting the slot insulating paper 3 and the plurality of coil conductors 5 into the slot 1 can be completed.

According to the first embodiment, the following effects are obtained.

(1) In each of the slots 1 of the stator core 32, the plurality of protrusions 7 protruding toward the space into which the coil conductors 5 are inserted are formed while spaced apart from each other in the longitudinal direction of the slot 1, and the inner surface of the slot 1 where the protrusions 7 are formed is covered with the slot insulating paper 3. Each of the partition regions 8 partitioned by a pair of protrusions 7 facing each other in the circumferential direction is also covered with the slot insulating paper 3. Each of the coil conductors 5 is inserted into this partition region 8. As a result, a gap 9 is formed between the coil conductors 5, and the coil conductors 5 are insulated from each other by the gap 9. Therefore, as compared to the conventional structure in which a slot insulating paper is formed, into a B-letter shape having a partition portion or an overlapping portion in order to insulate between coil conductors 5 from each other, insertion of the slot insulating paper 3 and the coil conductors 5 into the slot 1 becomes easier, and workability is thus improved. In addition, the shape of the slot insulating paper 3 is simplified, and the area can be reduced, thereby allowing the cost to be reduced.

(2) In each of the slots 1 of the stator core 32, the plurality of protrusions 7 are formed toward the space into which the coil conductors 5 are inserted. Therefore, it is possible to position the respective coil conductors 5 by the protrusions 7. As a result, as compared to the conventional structure in which the protrusions 7 are not included and positioning is performed only by the slot, insulating paper, workability is improved, and the positioning accuracy of the coil conductors 5 is improved. Moreover, in the conventional structure in which the protrusions 7 are not included and positioning is performed only by the slot insulating paper, it is necessary to allow the slot insulating paper to have a rigidity of a predetermined level or more, that is, to be a thick member in order to be able to suppress occurrence of deformation due to a load. On the other hand, in the structure of the first embodiment, it is only required to consider the insulating property, it is possible to reduce the thickness of the slot insulating paper 3, which also allows the cost to be reduced.

(3) Since the plurality of protrusions 7 are formed in each of the slots 1 of the stator core 32 toward the space into which the coil conductors 5 are inserted, and the protrusions 7 are covered with the slot insulating paper 3. Therefore, it is possible to reduce the thickness of the slot insulating paper 3 as described above. As a result, the space factor of the coil conductors 5 can be improved, thereby enabling downsizing.

(4) In the slot insulating paper 3 of the first embodiment, neither a partition portion nor an overlapping portion is formed. Since a partition portion and an overlapping portion have a large bending angle, the slot insulating paper is easily torn. The slot insulating paper 3 of the first embodiment can be improved of the strength and the quality as compared to those of the conventional art.

Mote that, in the first embodiment, the example in which the coil conductors 5 and the slot, insulating paper 3 are inserted in the slot 1 has been illustrated. However, instead of using the slot insulating paper 3, an insulating film such as an enamel coating may be formed on surfaces of the coil conductors 5. Also in such a structure, it is possible to reduce the work of inserting the slot insulating paper 3 into the slot 1 while securing an insulation distance between the coil conductors 5 by the protrusions 7 in the slot 1, thereby allowing assembling work of inserting the coil conductors 5 in the slot 1 to be further efficient.

Second Embodiment

Figure 3:
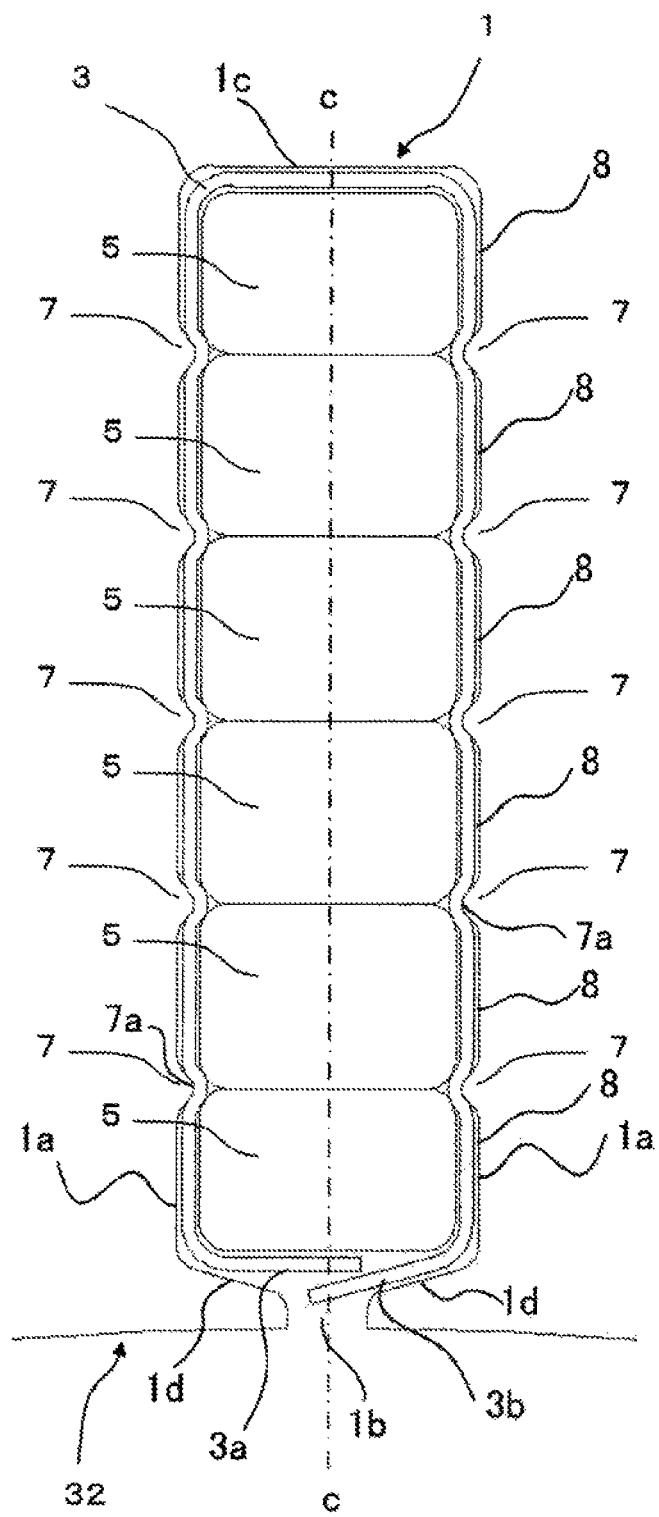
FIG. 3 is an enlarged sectional view, illustrating a second embodiment of the present invention, illustrating the interior of one slot obtained by cutting a stator core by a surface perpendicular to the axial direction at a center position in the axial direction.

FIG. 3 is an enlarged sectional view, illustrating a second embodiment of the present invention, illustrating the interior of one slot obtained by cutting a stator core of by a surface perpendicular to the axial direction at a center position in the axial direction.

In the second embodiment, a gap 9 for securing the space insulation distance is not provided between coil conductors 5 inserted adjacent to each other in a direction from the inner circumference to the outer circumference. An insulating film is formed on the surface of each of coil conductors 5. The insulating property can be ensured between the coil conductors 5 by providing an insulating film on the surface of each of the coil conductors 5. Therefore, in the second embodiment, the coil conductors 5 inserted adjacent to each other in the direction from the inner circumference to the outer circumference are laminated with insulating films interposed therebetween such that gaps 9 are not formed, between the coil conductors 5. The respective coil conductors 5 and the stator core 32 are insulated by a slot insulating paper 3 like in the first embodiment.

Also in the second embodiment, similar effects to those of the first embodiment are obtained.

Especially in the second embodiment, since a gap 9 for securing a space insulation distance is not provided between the coil conductors 5 inserted adjacent to each other in the slot 1, the space factor of the coil conductors 5 can be further raised. This results in an advantage in downsizing of a rotating electric machine 100.

Third Embodiment

Figure 4:
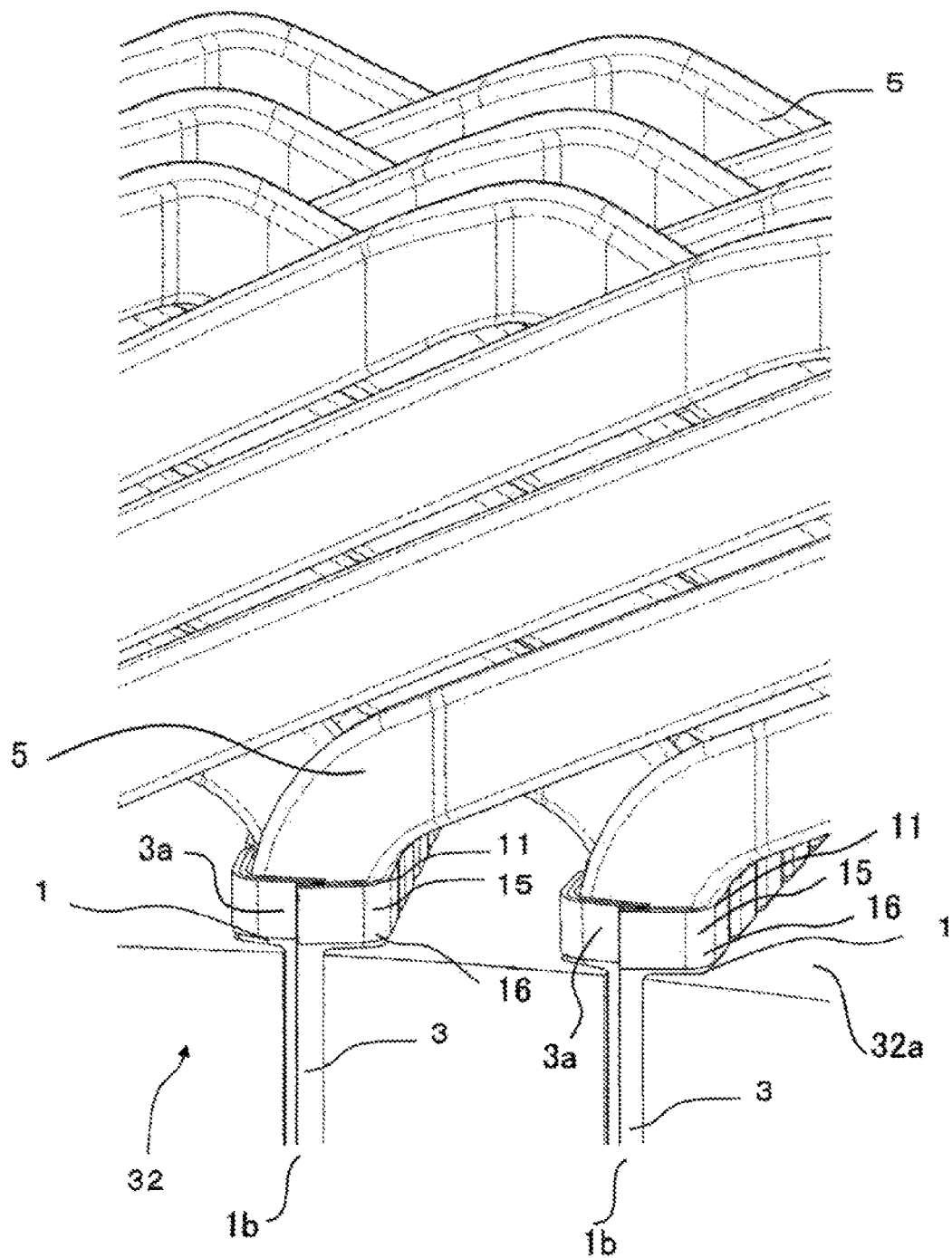
FIG. 4 is an enlarged perspective view, illustrating a third embodiment of the present invention, of a part of a stator core when viewed from one end surface side thereof.

FIG. 4 is an enlarged perspective view, illustrating a third embodiment of the present invention, of a part of a stator core when viewed from one end surface side thereof.

In the third embodiment, a slot insulating paper 3 is allowed to protrude from one end surface 32a of a stator core 32. A folded portion 11, folded to a side opposite to a side on which the stator core 32 is arranged, is formed and at an end portion 16 of this protruding portion 15.

In the first embodiment the slot insulating paper 3 is entirely accommodated in the slot 1, and thus the slot insulating paper 3 may be easily dragged by the coil conductors 5 to be displaced in the axial direction of the stator core 32 when the coil conductors 5 are inserted into the slot 1.

In the third embodiment on the other hand, the slot insulating paper 3 is allowed to protrude from the end surface 32a of the stator core 32. The folded portion 11, folded to the side opposite to the side on which the stator core 32 is arranged, is formed and at the end portion 16 of the protruding portion 15. Therefore, when the coil conductors 5 are inserted into the slot 1, displacement of the stator core 32 in the axial direction can be suppressed.

Mote that it is difficult to fold an end portion of the B-letter shaped conventional slot insulating paper having a partition portion or an overlapping portion. In the embodiment of the present invention, the protrusions 7 included in the slot 1 allow the coil conductors 5 to be held while spaced apart from each other. This allows the slot insulating paper 3 to have a substantially rectangular and simple shape along the circumferential surface of the slot 1, thereby enabling forming the folded portion 11 at the end portion 16 of the protruding portion 15 of the slot insulating paper 3.

Other structures of the third embodiment are similar to those of the first embodiment. Therefore, also in the third embodiment, similar effects to those of the first embodiment are obtained.

A segment coil conductor can be used as the coil conductors 5 in the first to the third embodiments. A segment coil conductor is a U-letter shaped or a V-letter shaped member in which end sides of a pair of linear conductors are connected and the other end sides thereof are open. Each of the linear conductors of the segment coil conductor is inserted separately for every other slots 1 of a predetermined number from the end surface 32a side of the stator core 32, and the other end portion projecting outward from the other end surface 32b side of the stator core 32 is joined to another segment coil conductor. As a result, stator winding 36 of each phase is formed.

In the above embodiment, the example in which each of the coil conductors 5 is a member, called a rectangular wire, having a substantially rectangular sectional shape has been illustrated. However, the coil conductors 5 may have a round wire shape.

In the above embodiment, the example in which six coil conductors 5 are inserted into the slot 1 has been illustrated; however, the present invention may be applied to a rotating electric machine 100 having two or more coil conductors 5 to be inserted into a slot 1.

The cross-sectional shape of a protrusion 7 is not limited to a triangle. Any shape may be employed such as a rectangular cross section and an arc cross section.

Moreover, the present invention can also be applied to an outer rotor.

Although various embodiments and variations have been described above, the present invention is not limited to these contents. Other embodiments conceivable within the scope of the technical ideas of the present invention are also included in the scope of the present invention.

REFERENCE SIGNS LIST 1 slot
1a side surface
3 slot insulating paper (insulating member, slot insulating sheet)
3a one end portion
3b other end portion (end portion)
5 coil conductor (segment coil conductor)
7 protrusion
9 gap
11 folded portion
15 protruding portion
30 stator
32 stator core
32a one end surface
32b other end surface
33 shaft (rotating shaft)
36 stator winding
50 rotor
100 rotating electric machine

The invention claimed is:

1. A rotating electric machine, comprising:
a rotor pivotally supported by a rotating shaft; and
a stator arranged on a circumferential surface of the rotor with a minute gap interposed therebetween, wherein
the stator includes a stator core formed with a plurality of slots formed at a predetermined depth in a radial direction and arranged while spaced apart from each other in a circumferential direction and stator winding having a coil conductor inserted in each of the slots,
a plurality of protrusions are formed in each of the slots of the stator core toward a space into which the coil conductor is inserted,
the plurality of protrusions form a plurality of partition regions into which the coil conductors are inserted in such a manner as to be adjacent to each other in each of the slots, and
the protrusions of the plurality of partition regions are formed while protruding between the coil conductors such that a distance between the coil conductors inserted in each of the partition regions is more than or equal to a predetermined distance.

2. The rotating electric machine according to claim 1, wherein the coil conductor includes a plurality of segment coil conductors.

3. The rotating electric machine according to claim 1, further comprising:
an insulating member arranged between the coil conductor and the protrusions.

4. The rotating electric machine according to claim 3, wherein each of the slots has a pair of side surfaces extending in a direction perpendicular to a circumferential surface of the stator core,
the protrusions are included in each of the pair of side surfaces, and
the insulating member is a slot insulating sheet arranged to cover the respective side surfaces together with the respective protrusions.

5. The rotating electric machine according to claim 4, wherein the slot insulating sheet has a protruding portion protruding to the outside from one end surface of the stator core in an axial direction, and
the protruding portion has an end portion folded to a side opposite to a side on which the stator core is arranged.

6. A rotating electric machine, comprising:
a rotor pivotally supported by a rotating shaft;
a stator arranged on a circumferential surface of the rotor with a minute gap interposed therebetween, wherein
the stator includes a stator core formed with a plurality of slots formed at a predetermined depth in a radial direction and arranged while spaced apart from each other in a circumferential direction and stator winding having a coil conductor inserted in each of the slots,
a plurality of protrusions are formed in each of the slots of the stator core toward a space into which the coil conductor is inserted; and
an insulating member arranged between the coil conductor and the protrusions, wherein
each of the slots has a pair of side surfaces extending in a direction perpendicular to a circumferential surface of the stator core,
the protrusions are included in each of the pair of side surfaces,
the insulating member is a slot insulating sheet arranged to cover the respective side surfaces together with the respective protrusions,
the slot insulating sheet has a protruding portion protruding to the outside from one end surface of the stator core in an axial direction, and
the protruding portion has an end portion folded to a side opposite to a side on which the stator core is arranged.

* * * * *